United States Patent [19]

Friedrich et al.

[11] 4,434,681

[45] Mar. 6, 1984

[54] HYDROMECHANICAL DRIVE

[75] Inventors: Ehrlinger Friedrich, Freidrichshafen; Michael Meyerle, Meckenbeuren, both of Fed. Rep. of Germany

[73] Assignee: Zahnradfabrik Friedrichshafen AG, Friedrichshafen, Fed. Rep. of Germany

[21] Appl. No.: 327,690

[22] Filed: Dec. 4, 1981

Related U.S. Application Data

[63] Continuation of Ser. No. 103,437, Dec. 14, 1979, abandoned.

[30] Foreign Application Priority Data

Dec. 16, 1978 [DE] Fed. Rep. of Germany ....... 2854375

[51] Int. Cl.³ ............................................ F16H 47/04
[52] U.S. Cl. ........................................ 74/687; 74/677
[58] Field of Search .............. 74/687, 681, 677, 752 C

[56] References Cited

U.S. PATENT DOCUMENTS

| 3,048,057 | 8/1962 | Dodge | 74/677 |
|---|---|---|---|
| 3,592,079 | 7/1971 | Mori | 74/688 |
| 3,667,321 | 6/1972 | Maurice | 74/687 |
| 3,714,845 | 2/1973 | Mooney, Jr. | 74/687 |
| 3,880,017 | 4/1975 | Miyao et al. | 74/687 |
| 3,969,957 | 7/1976 | DeLalio | 74/687 |
| 3,979,972 | 9/1976 | Sakai et al. | 74/687 |
| 4,008,628 | 2/1977 | Orshansky, Jr. | 74/687 |
| 4,114,475 | 9/1978 | Orshansky, Jr. | 74/789 |
| 4,116,089 | 9/1978 | Orshansky, Jr. | 74/687 |
| 4,134,310 | 1/1979 | Orshansky, Jr. | 74/687 |
| 4,168,637 | 9/1979 | Orshansky, Jr. | 74/687 |
| 4,291,592 | 9/1981 | Meyerle et al. | 74/687 |

FOREIGN PATENT DOCUMENTS

| 236182 | 2/1964 | Austria | 74/677 |
|---|---|---|---|
| 2534374 | 2/1977 | Fed. Rep. of Germany | 74/687 |
| 2716960 | 10/1978 | Fed. Rep. of Germany | 74/687 |
| 2757191 | 7/1979 | Fed. Rep. of Germany | 74/687 |
| 70206 | 3/1959 | France | 74/687 |

OTHER PUBLICATIONS

Oilgear, Bulletin 10600; Oct. '58, The Oilgear Co.

*Primary Examiner*—Leslie A. Braun
*Assistant Examiner*—D. Wright
*Attorney, Agent, or Firm*—Karl F. Ross

[57] ABSTRACT

A hydromechanical transmission has an engine-driven power shaft connected to a variable-volume pump forming the input side of a hydrostatic unit whose output side comprises a constant-volume motor connected to this pump. A summing planetary-gear train has a first ring gear connected directly to the power shaft, a second ring gear connected to the hydraulic motor and a planet carrier with two interengaging sets of planet gears, one set meshing with the first ring gear and the other set meshing with the second ring gear as well as with a sun gear. An output shaft of the transmission can be connected via a high-range clutch to the sun gear of the summing train or via a low-range clutch to the planet carrier thereof to provide a speed ratio which is steplessly variable in two ranges.

5 Claims, 2 Drawing Figures

HYDROMECHANICAL DRIVE

CROSS-REFERENCE TO RELATED APPLICATIONS

This application is a continuation of our copending application Ser. No. 103,437, filed Dec. 14, 1979, now abandoned and contains subject matter disclosed in our copending application Ser. No. 967,006, filed Dec. 6, 1978, now U.S. Pat. No. 4,291,592.

FIELD OF THE INVENTION

Our present invention relates to a hydromechanical transmission; adapted to be inserted as a variable-speed coupling between a motor-vehicle engine and its wheels.

BACKGROUND OF THE INVENTION

A hydromechanical transmission is frequently used as a coupling between the traction wheels of a vehicle and its engine. In particular in heavy-duty construction equipment as well as in masstransit road vehicles it is frequently necessary to provide a transmission capable of producing a variable-speed output from a fixed-speed input so that the vehicle may be driven at different speeds by a prime mover such as a Diesel engine operating effectively at a more or less constant speed.

A typical such transmission can be seen in U.S. Pat. No. 3,489,036 issued Jan. 13, 1970 to Cockrell & Dorgan. In this drive a split-torque transmission has a planetary-gear train used to combine the speeds and torques of a hydrostatic unit of an input shaft. A second planetary-gear train is used to combine the speeds and torques of the input shaft and of the ring gear of the first planetary-gear train to drive the output shaft. Between the ring gear of the second planetary-gear train and the planet gears of the first train additional gearing is provided to drive the ring gear either in a direction opposite that of the planet gears or codirectionally therewith.

This transmission therefore, empolys two sets of planetary gears with a hydrostatic unit to achieve what is normally referred to as a two-range output, one of the ranges—normally the low range—also including a reverse-speed subrange. This assembly is, therefore, relatively effective but also rather complicated since amount of gearing necessary to achieve steplessly variable speed ratios across the two ranges is considerable. This general type of tranmission is therefore expensive to produce, failure-prone and difficult to service.

OBJECTS OF THE INVENTION

It is therefore an object of our present invention to provide an improved hydromechanical transmission of the two-range type referred to.

Another object is to provide a transmission of this description which is relatively small and simple, being thus unlikely to fail and easy to service.

A further object is to provide a transmission of this description which is so compact that losses within it are inherently also very small.

SUMMARY OF THE INVENTION

We realize these objects, in accordance with our present invention, by providing a hydrostatic unit and a planetary-gear train in cascade with each other between an engine-driven power shaft and an output shaft coupled to a load, together with a direct connection between the power shaft and the planetary-gear train. The hydrostatic unit comprises a driving element and a driven element which are fluidically coupled to each other for joint rotation at a speed ratio that is variable between predetermined negative and positive limits, specifically a variable-volume pump and a constant-volume motor. The driving element (pump) is positively coupled with the power shaft for rotation thereby, this shaft being also positively coupled with a first input gear of the planetary-gear train which has a second input gear positively coupled with the driven element (motor). The two input gears and an output gear, all centered on a common axis, coact with a planet carrier rotatable about the same axis; a first planet gear or pinion on that carrier meshes with the first input gear and with a preferably larger second planet gear or pinion on that carrier, the latter pinion being further in mesh with the second input gear and with the output gear of the planetary train. In the embodiment described hereinafter, the input gears are ring gears and the output gear is a sun gear. The output shaft can be selectively coupled, via a first and a second clutch, with the planet carrier in a range of low speeds and with the output (sun) gear in a range of high speeds relative to the power shaft.

With the aid of control means coupled with the hydrostatic unit and with the two clutches, the speed ratio of the driving and driven elements (pump and motor) can be varied in each of these ranges between the aforementioned negative and positive limits; a switchover from one clutch to the other occurs only at a point where that speed ratio is at its positive limit at which the planet carrier and the input and output gears of the planetary train all corotate at the same speed.

BRIEF DESCRIPTION OF THE DRAWING

The above and other features of our present invention will now be described in detail with reference to the accompanying drawing in which.

SPECIFIC DESCRIPTION

Figure 1:
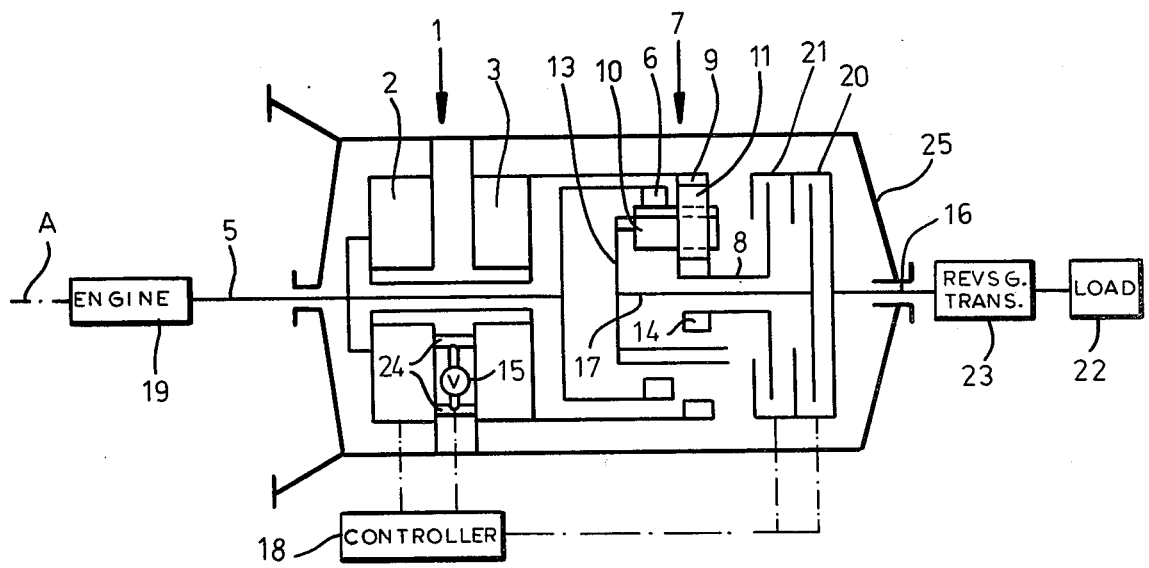
FIG. 1 is a largely schematic view illustrating a transmission according to the instant invention.

As shown in in FIG. 1 a hydromechanical transmission according to our instant invention has a stationary housing 25 that is centered on an axis A and lies between a motor-vehicle engine 19 and a load 22, the latter normally being constituted by the road wheels of a vehicle equipped with the engine 19. This drive basically comprises an input or power shaft 5 connected to the engine 19, a hydrostatic unit 1 having a driving element in the form of a variable-volume-axial-piston pump 2 and a driven element in the form of a constant-volume motor 3, and a summing mechanism 7 connected on one side to the hydrostatic unit 1 and on the other side via a low-range clutch 20 a high-range clutch 21 to an output shaft 16 which is coaxial with the input shaft 5 and connectable through a reversing transmission 23 with the load 22.

Unit 1 comprises an axial-piston pump 2 connected via a pair of normally pressurized lines 24 to a constant-volume axial-piston motor 3. The rotor of the variable-volume pump 2 is connected directly and permanently to the input shaft 5 which passes coaxially through the pump 2 and motor 3.

The summing mechanism 7 is constituted by a planetary-gear train which is also centered on the axis A and includes a relatively small ring gear 6, fixed to input shaft 5, and a larger-diameter ring gear 9 connected to the output side of the hydrostatic motor 3. A planet carrier 13 rotatably supports a first set of planet gears or pinions 10 of smaller radius meshing with the ring gear 6 and a second set of planet gears or pinions 11 of larger radius that mesh with the ring gear 9 and also each with respective gears 10. A sun gear 14 meshes with all the larger planet gears 11. A shaft 17 is connected to the planet carrier 13 and constitutes one output of the planetary-gear train 7. The sun gear 14, through which the shaft 17 passes, has a tubular shaft 8 which and constitutes the other output of the planetary-gear train 7. The output shaft 17 of unit 1 is connected to the disk of the low-range clutch 20 while the sun gear shaft 8 is connected to the disk of the high-range clutch 21.

A controller 18 operates the pump 2, the clutches 20 and 21, and a normally closed shunt valve 15 connected between the hydraulic lines 24.

Figure 2:
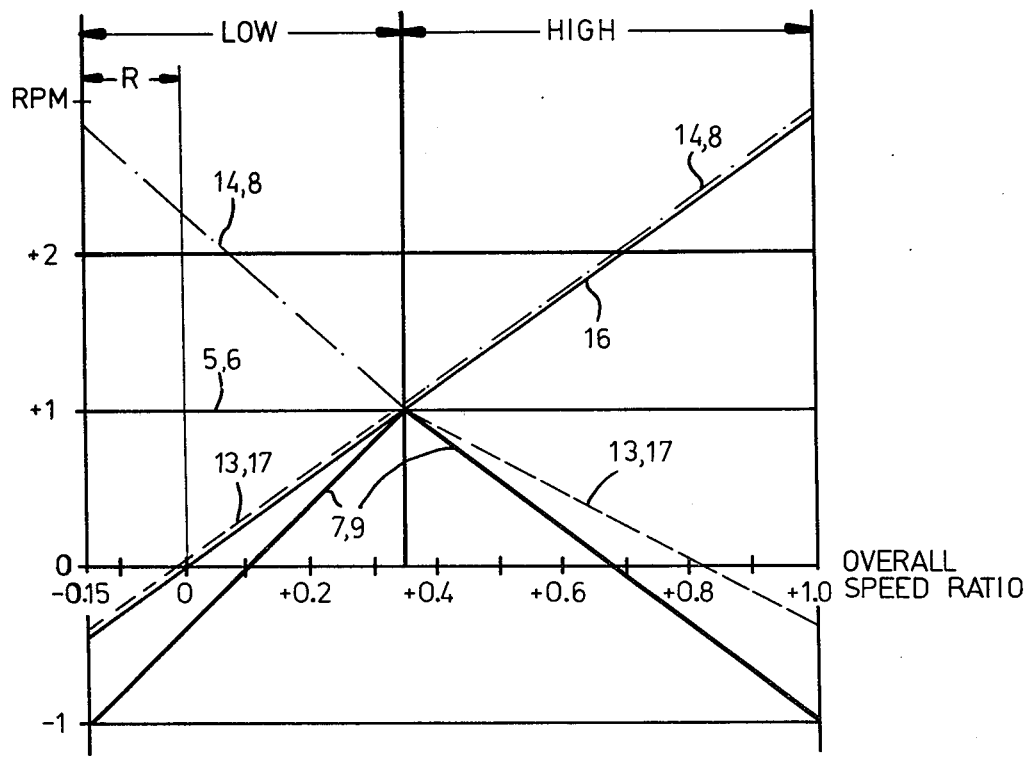
FIG. 2 is a diagram illustrating the operation of the system according to this invention.

In the diagram of FIG. 2 we have plotted, in the usual manner, the individual rotary speed (RPM) of the several components of the transmission of FIG. 1 against overall speed ratio, i.e. the speed of output shaft 16 relative to that of input shaft 5. This ratio has been indicated on the abscissa in fractions of its positive maximum, designated $+1.0$, and is seen to start at a negative maximum of $-0.15$. A subrange R of reverse rotation, extending from that negative maximum to a zero point O, is part of a low-speed range bounded at a switchover point of about $+0.35$ which marks the beginning of a high-speed range ending at the maximum $+1.0$.

The diagram shows by a solid horizontal line 5,6 the speed —considered constant— of power shaft 5 and the first input gear 6 of planetary train 7, that speed constituting a reference value $+1$. A heavy solid line 7,9 gives the speed of the second input gear 9 of that train and thus the speed of hydrostatic motor 3 directly connected with that gear. A dotted line 13, 17 respresents the speed of planet carrier 13 and its shaft 17, while a dot-dash line 14, 8 denotes the speed of sun gear 14 and its shaft 8. The speed of output shaft 10 is indicated by a thin solid line of constant slope designated by the same numeral.

In the low-speed range, marked by the closure of clutch 20, shaft 16 rotates at the speed of planet carrier 13; in the subrange R, its sense of rotation is opposite that of power shaft 5. In the high-speed range, shaft 16 rotates at the speed of sun gear 14 with which it is then coupled by the clutch 21. The changeover from one clutch to the other occurs at the switchover point where lines 5,6,7,9,13,17,14,8 and 16 intersect. This switchover point represents the positive limit of the speed-ratio variation of hydrostatic unit 1 and thus has a value $+1$; the negative limit of that variation has the value $-1$ and is seen to occur at both the lower and the upper end of the scale of continuously variable overall speed ratio. Hydrostatic unit 1 thus operates in reverse in the first half of the low-speed range and again in the second half of the high-speed range. The points where line 7,9 crosses the abscissa axis, lying both in the region of forward rotation of output shaft 16, correspond to standstill of hydrostatic motor 3 and thus to a neutral position of the adjustable swash plate of pump 2; that swash plate, therefore, is tilted backward (line 7 below the zero level) at abscissa point 0 at which output shaft 16 is stationary. It will further be noted that the output speed at the positive end of the scale is almost three times that of input shaft 5.

The system according to the instant invention places most the power in its center of adjustability, namely between the 20% and the 80% value of the overall transmission ratio. In this range the highest efficiency is obtained, so that our improved transmission is ideally suited for heavy-duty medium-speed use. The reversing transmission 23 is needed when the drive system according to this invention is to be used in a grader or similar such construction machine which must be able to move at the same speed backward and forward.

Thus the transmission according to the instant invention is relatively simple yet achieves a steplessly-variable overall speed ratio from the input shaft 5 to the output shaft 16, between a reverse speed at $-0.15$ and a miximum forward speed at $+1.0$ range. As only two clutches are provided in the transmission, along with only one hydrostatic transmission, and only one four-shaft planetary gear transmission, the device is extremely simple. This simplicity reduces losses greatly while simultaneously reducing the likelihood of failure and increasing the ease of servicing.

We claim:

1. A hydromechanical transmission comprising:
   a power shaft driven by a prime mover;
   a hydrostatic unit with a driving element and a driven element fluidically coupled to each other for joint rotation at a speed ratio variable between predetermined negative and positive limits, said driving element being positively coupled to said power shaft for rotation thereby;
   a planetary-gear train with a first and a second input gear and one output gear centered on a common axis, a planet carrier rotatable about said axis, a first pinion on said planet carrier in mesh with said first input gear and a second pinion on said planet carrier in mesh with said first pinion, with said second input gear and with said output gear, said first input gear being positively coupled with said power shaft, said second input gear being positively coupled with said driven element;
   an output shaft coupled to a load;
   a first clutch operable to couple said output shaft with said planet carrier in a range of low speeds of said output shaft relative to said power shaft;
   a second clutch operable to couple said output shaft with said output gear in a range of high speeds of said output shaft relative to said power shaft; and
   control means coupled with said hydrostatic unit and with said clutches for varying said speed ratio between said negative and positive limits in each of said ranges and for alternately operating said clutches, with a switchover from one clutch to the other at a point where said speed ratio is at said positive limit with said planet carrier, said input gears and said output gear all co-rotating at the same speed.

2. A transmission as defined in claim 1 wherein said second pinion is of larger radius than said first pinion.

3. A transmission as defined in claim 1 or 2 wherein said input gears are ring gears and said output gear is a sun gear.

4. A transmission as defined in claim 3 wherein said input element is a variable-volume pump and said output element is a constant-volume motor.

5. A transmission as defined in claim 4 wherein said pump is adjustable by said control means between a backward-driving position representing said negative limit and a forward-driving position representing said positive limit, said motor rotating in opposite directions but at substantially the same speed in said backward-driving and forward-driving positions.

* * * * *